(12) United States Patent
Sarikaya

(10) Patent No.: US 9,036,633 B2
(45) Date of Patent: May 19, 2015

(54) MULTICAST SUPPORT FOR INTERNET PROTOCOL VERSION FOUR RESIDUAL DEPLOYMENT VIA ENCAPSULATION OR TRANSLATION

(71) Applicant: Futurewei Technologies, Inc., Plano, TX (US)

(72) Inventor: Behcet Sarikaya, Wylie, TX (US)

(73) Assignee: Futurewei Technologies, Inc., Plano, TX (US)

( * ) Notice: Subject to any disclaimer, the term of this patent is extended or adjusted under 35 U.S.C. 154(b) by 288 days.

(21) Appl. No.: 13/652,183

(22) Filed: Oct. 15, 2012

(65) Prior Publication Data

US 2013/0094505 A1    Apr. 18, 2013

Related U.S. Application Data

(60) Provisional application No. 61/547,921, filed on Oct. 17, 2011.

(51) Int. Cl.
| | |
|---|---|
| H04L 29/06 | (2006.01) |
| H04L 29/12 | (2006.01) |
| H04L 12/721 | (2013.01) |
| H04L 12/18 | (2006.01) |

(52) U.S. Cl.
CPC ............ H04L 12/185 (2013.01); H04L 12/184 (2013.01)

(58) Field of Classification Search
USPC .................................................. 370/390, 467
See application file for complete search history.

(56) References Cited

U.S. PATENT DOCUMENTS

2002/0093960 A1* 7/2002 Tsuchiya et al. ............. 370/390
2003/0073453 A1* 4/2003 Basilier ......................... 455/503
2005/0249213 A1* 11/2005 Higuchi et al. ................ 370/390
2006/0140213 A1* 6/2006 Hwang et al. ................. 370/466
2006/0209831 A1* 9/2006 Shepherd et al. ............. 370/392
2006/0274720 A1 12/2006 Adams et al.
2007/0243821 A1* 10/2007 Hundscheidt et al. ........ 455/3.04
2011/0286470 A1* 11/2011 Dec et al. ...................... 370/467

FOREIGN PATENT DOCUMENTS

| CN | 101296179 A | 10/2008 |
|---|---|---|
| WO | 2006053027 A2 | 5/2006 |

OTHER PUBLICATIONS

O. Vautrin, IPv4 Rapid Deployment on IPv6 Infrastructures (4rd), Jul. 29, 2010, Juniper Network.*
Vautrin, O., "IPv4 Rapid Deployment on IPv6 Infrastructures (4rd)," Softwire, Internet Draft, draft-vautrin-softwire-4rd-00, Jul. 29, 2010, 9 pages.
Bao, C., et al., "MAP Translation (MAP-T)—Specification," Softwires, Internet Draft, draft-mdt-softwire-map-translation-01, Mar. 9, 2012, 23 pages.
Despres, R., Ed., et al., "IPv4 Residual Deployment via IPv6—A Stateless Solution (4rd)," Internet Engineering Task Force, Internet Draft, draft-ietf-softwire-4rd-03, Jul. 16, 2012, 43 pages.

(Continued)

*Primary Examiner* — Andrew Chriss
*Assistant Examiner* — John Lequang
(74) *Attorney, Agent, or Firm* — Conley Rose, P.C.; Grant Rodolph; Brandt D. Howell

(57) ABSTRACT

Included is an Internet Protocol (IP) version four (IPv4) Residual Deployment via IP version six (IPv6) (4rd) customer edge (CE) comprising a transceiver configured to communicate with an IPv6 network, and a processor coupled to the transceiver and configured to receive multicast packets from a multicast source via the IPv6 network, and transmit the multicast packets to a host. The disclosure also includes a 4rd border relay (BR) comprising a transceiver configured to communicate with an IPv6 network, and a processor coupled to the transceiver and configured to receive multicast packets from a multicast source, and transmit the multicast packets to a host via the IPv6 network and a 4rd customer edge (CE).

14 Claims, 7 Drawing Sheets

(56) References Cited

OTHER PUBLICATIONS

Troan, O., "Mapping of Address and Port with Encapsulation (MAP)," Network Working Group, Internet Draft, draft-ietf-softwire-map-02, Sep. 5, 2012, 30 pages.
Boucadiar, M., Ed., et al., "IPv4-Embedded IPv6 Multicast Address Format," Network Working Group, Internet Draft, draft-boucadair-64-multicast-address-format-00, Jan. 23, 2012, 12 pages.
Boucadiar, M., Ed., et al., "IPv4-Embedded IPv6 Multicast Address Format," Behave WG, Internet Draft, draft-boucadair-bhave-64-multicast-address-format-02, Jun. 24, 2011, 17 pages.
Despres, R., "Unifying Double Translation and Encapsulation for 4rd (4rd-U)," Internet Engineering Task Force, Internet Draft, draft-despres-softwire-4rd-u-00, Oct. 12, 2011, 8 pages.
Despres, R., Ed., et al., "IPv4 Residual Deployment via IPv6—Unified Solution (4rd)," Internet Engineering Task Force, Internet Draft, draft-despres-softwire-4rd-u-06, Mar. 28, 2012, 36 pages.
Thaler, D., et al., "Automatic IP Multicast Tunneling," Network Working Group, Internet Draft, draft-ietf-mboned-auto-multicast-11, Jul. 11, 2011, 37 pages.
Bumgardner, G., "Automatic Multicast Tunneling," Network Working Group, Internet Draft, draft-ietf-mboned-auto-multicast-14, Jun. 12, 2012, 85 pages.
Despres, R., Ed., et al., IPv4 Residual Deployment via IPv6—a Stateless Solution (4rd), Internet Engineering Task Force, Internet Draft, draft-ietf-softwire-4rd-01, Jun. 19, 2012, 41 pages.
Troan, O., et al., "Mapping of Address and Port (MAP)," Network Working Group, Internet Draft, draft-mdt-softwire-mapping-address-and-port-03, Jan. 30, 2012, 20 pages.
Venaas, S., et al., "An IPv4-IPv6 Multicast Translator," Network Working Group, Internet Draft, draft-venaas-behave-mcast46-02.txt, Dec. 22, 2010, 12 pages.
Wing, D. "Learning the IPv6 Prefix of a Network's IPv6/IPv4 Translator," Network Working Group, Internet Draft, draft-wing-behave-learn-prefix-04, Oct. 26, 2009, 14 pages.
Bao, C., et al., "dIVI. Dual-Stateless IPv4/IPv6 Translation," Network Working Group, Internet Draft, draft-xli-behave-divi-03, Jul. 10, 2011, 15 pages.
Bao, C., et al., "dIVI: Dual-Stateless IPv4/IPv6 Translation," Network Working Group, Internet Draft, draft-xli-behave-divi-04, Oct. 31, 2011, 14 pages.
Deering, S., "Host Extensions for IP Multicasting," Network Working Group, RFC 1112, Aug. 1989, 18 pages.
Bradner, S., "Key Words for Use in RFCs to Indicate Requirement Levels," Network Working Group, RFC 2119, Mar. 1997, 4 pages.
Conta, A., et al., "Generic Packet Tunneling in IPv6 Specification," Network Working Group, RFC 2473, Dec. 1998, 37 pages.
Armitage, G., et al., "IPv6 Over Non-Broadcast Multiple Access (NBMA) Networks," Network Working Group, RFC 2491, Jan. 1999, 45 pages.
Rose, M., "Writing I-Dx and RFCs Using XML," Network Working Group, RFC 2629, Jun. 1999, 32 pages.
Nordmark, E., "Stateless IP/ICMP Translation Algorithm (SIIT)," Network Working Group, RFC 2765, Feb. 2000, 27 pages.
Srisuresh, P. et al., "Traditional IP Network Address Translator (Traditional NAT)," Network Working Group, RFC 3022, Jan. 2001, 17 pages.
Haberman, B., et al., "Unicast-Prefix-Based IPv6 Multicast Addresses," Network Working Group, RFC 3306, Aug. 2002, 8 pages.
Haberman, B., "Allocation Guidelines for IPv6 Multicast Addresses," Network Working Group, RFC 3307, Aug. 2002, 9 pages.
Cain, B., et al., "Internet Group Management Protocol, Version 3," Network Working Group, RFC 3376, Oct. 2002, 54 pages.
Vida, R, Ed., et al., "Multicast Listener Discovery Version 2 (MLDv2) for IPv6," Network Working Group, RFC 3810, Jun. 2004, 63 pages.
Savola, P., et al., "Embedding the Rendezvous Point (RP) Address in an IPv6 Multicast Address," Network Working Group, RFC 3956, Nov. 2004, 19 pages.
Kent, S., et al., "Security Architecture for the Internet Protocol," Network Working Group, RFC 4301, Dec. 2005, 102 pages.
Kent, S., "IP Authentication Header," Network Working Group, RFC 4302, Dec. 2005, 35 pages.
Kent, S., "IP Encapsulating Security Payload (ESP)," Network Working Group, RFC 4303, Dec. 2005, 45 pages.
Fenner, B., et al., "Internet Group Management Protocol (IGMP)/Multicast Listener Discovery (MLD)-Based Multicast Forwarding ("Igmp/MLD Proxying")," Network Working Group, RFC 4605, Aug. 2006, 13 pages.
Holbrook, H., et al., "Source-Specific Multicast for IP," Network Working Group, RFC 4607, Aug. 2006, 20 pages.
Wing, D., et al., "IP Multicast Requirements for a Network Address Translator (NAT) and a Network Address Port Translator (NAPT)," Network Working Group, RFC 5135, Feb. 2008, 17 pages.
Bao, C., et al., "IPv6 Addressing of IPv4/IPv6 Translators," Internet Engineering Task Force (IETF), RFC 6052, Oct. 2010, 19 pages.
Li, X., et al., "IP/ICMP Translation Algorithm," Internet Engineering Task Force (IETF), RFC 6145, Apr. 2011, 34 pages.
Foreign Communication From a Related Counterpart Application, International Application No. PCT/CN2012/083060, International Search Report dated Nov. 22, 2012, 3 pages.
Foreign Communication From a Related Counterpart Application, International Application No. PCT/CN2012/083060, Written Opinion dated Nov. 22, 2012, 7 pages.
Sarikaya, B., "Multicast Support for 4rd," Network Working Group, Internet Draft, draft-sarikaya-softwire-4rdmulticast-00.txt, Oct. 7, 2011, 17 pages.
Cui, Y., et al., "Lightweight 4over6 in access network," draft-cui-softwire-b4-translated-ds-lite-02, Sep. 30, 2011, 15 pages.
Cui, Y., et al. "Lightweight 4over6: An Extension to the DS-Lite Architecture," draft-cui-softwire-b4-translated-ds-lite-08, Sep. 21, 2012, 18 pages.
Wang, Q., et al., "Multicast Extensions to DS-Lite Technique in Broadband Deployments," draft-ietf-softwire-dslite-multicast-00, Sep. 10, 2011, 20 pages.
Qin, J., et al., "Delivery of IPv4 Multicast Services to IPv4 Clients over an IPv6 Multicast Network," draft-ietf-softwire-dslite-multicast-03, Aug. 23, 2012, 20 pages.
Li, X., et al., "Mapping of Address and Port using Translation (MAP-T)," draft-ietf-softwire-map-t-00, Oct. 12, 2012, 29 pages.
Boucadair, M., et al., "DHCPv6 Option for IPv4-Embedded Multicast and Unicast IPv6 Prefixes," draft-ietf-softwire-multicast-prefix-option-01, Aug. 6, 2012, 8 pages.
Perreault, S., et al., "Internet Group Management Protocol (IGMP) / Multicast Listener Discovery (MLD)—Based Multicast Translation ("IGMP/MLD Translation")," draft-perreault-mboned-igmp-mld-translation-01, Apr. 10, 2012, 16 pages.
Sarikaya, B., et al., "IPv6 RA Options for Translation Multicast Prefixes," draft-sarikaya-softwire-6man-raoptions-00, Aug. 25, 2012, 12 pages.
Katz, D., et al., "IP Router Alert Option," RFC 2113, Feb. 1997, 4 pages.
Partridge, C., et al., "IPv6 Router Alert Option," RFC 2711, Oct. 1999, 6 pages.
Albanna, Z., et al., "IANA Guidelines for IPv4 Multicast Address Assignments," RFC 3171, Aug. 2001, 8 pages.
Nordmark, E., et al., "Basic Transition Mechanisms for IPv6 Hosts and Routers," RFC 4213, Oct. 2005, 27 pages.
Schmidt, T., et al., "Base Deployment for Multicast Listener Support in Proxy Mobile IPv6 (PMIPv6) Domains," RFC 6224, Apr. 2011, 19 pages.
Perkins, C., Ed., et al., "Mobility Support in IP6," RFC 6275, Jul. 2011, 169 pages.
Durand, A., et al., "Dual-Stack Lite Broadband Deployments Following IPv4 Exhaustion," RFC 6333, Aug. 2011, 32 pages.

\* cited by examiner

MULTICAST SUPPORT FOR INTERNET PROTOCOL VERSION FOUR RESIDUAL DEPLOYMENT VIA ENCAPSULATION OR TRANSLATION

CROSS-REFERENCE TO RELATED APPLICATIONS

The present application claims priority to U.S. Provisional Patent Application 61/547,921, filed Oct. 17, 2011 by Behcet Sarikaya and entitled "Multicast Support for Internet Protocol Version Four Rapid Deployment," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Each device connected to a computer network may be assigned an Internet protocol (IP) address. As more devices are connecting to the Internet, via their respective networks, the reservoir of available Internet protocol (IP) version four (IPv4) addresses is being depleted. In order to avoid IP address depletion, the industry is shifting to the use IP version six (IPv6) addresses. Legacy equipment designed to use the IPv4 address system may be unable to communicate directly with IPv6 networks. Such legacy equipment may continue to access the Internet through transmission mechanisms such as IPv4 Residual Deployment via IPv6 (4rd). However, traditional 4rd systems support only unicast transmission and do not support multicast transmission.

SUMMARY

In one embodiment, the disclosure includes 4rd customer edge (CE) comprising a transceiver configured to communicate with an IPv6 network, and a processor coupled to the transceiver and configured to receive multicast packets from a multicast source via the IPv6 network, and transmit the multicast packets to a host.

In another embodiment, the disclosure includes a 4rd border relay (BR) comprising a transceiver configured to communicate with an IPv6 network, and a processor coupled to the transceiver and configured to receive multicast packets from a multicast source, and transmit the multicast packets to a host via the IPv6 network and a 4rd CE.

In yet another embodiment, the disclosure includes, a method comprising sending, by a host, an internet group management protocol (IGMP) join message to 4rd CE router, encapsulating, by the CE, the IGMP join message in an IPv6 message and sending the IPv6 message over a network tunnel to a 4rd BR in anycast, receiving, by the BR, the IPv6 message and decapsulating the IPv6 message, and sending, by the BR, an upstream IGMP join message or a protocol independent multicast (PIM) join message to subscribe to a multicast group.

In yet another embodiment, the disclosure includes a method comprising, sending, by a host, a subscription request for an IPv4 multicast group upstream to a 4rd CE, wherein the CE comprises an IGMP proxy facing an IPv4 local area network (LAN) interface and a multicast listener discovery (MLD) proxy facing an IPv6 wide area network (WAN) interface, synthesizing, by the CE, an IPv6 multicast group address corresponding to the IPv4 multicast group, and sending, by the MLD proxy, an MLD report message upstream to join the multicast group.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
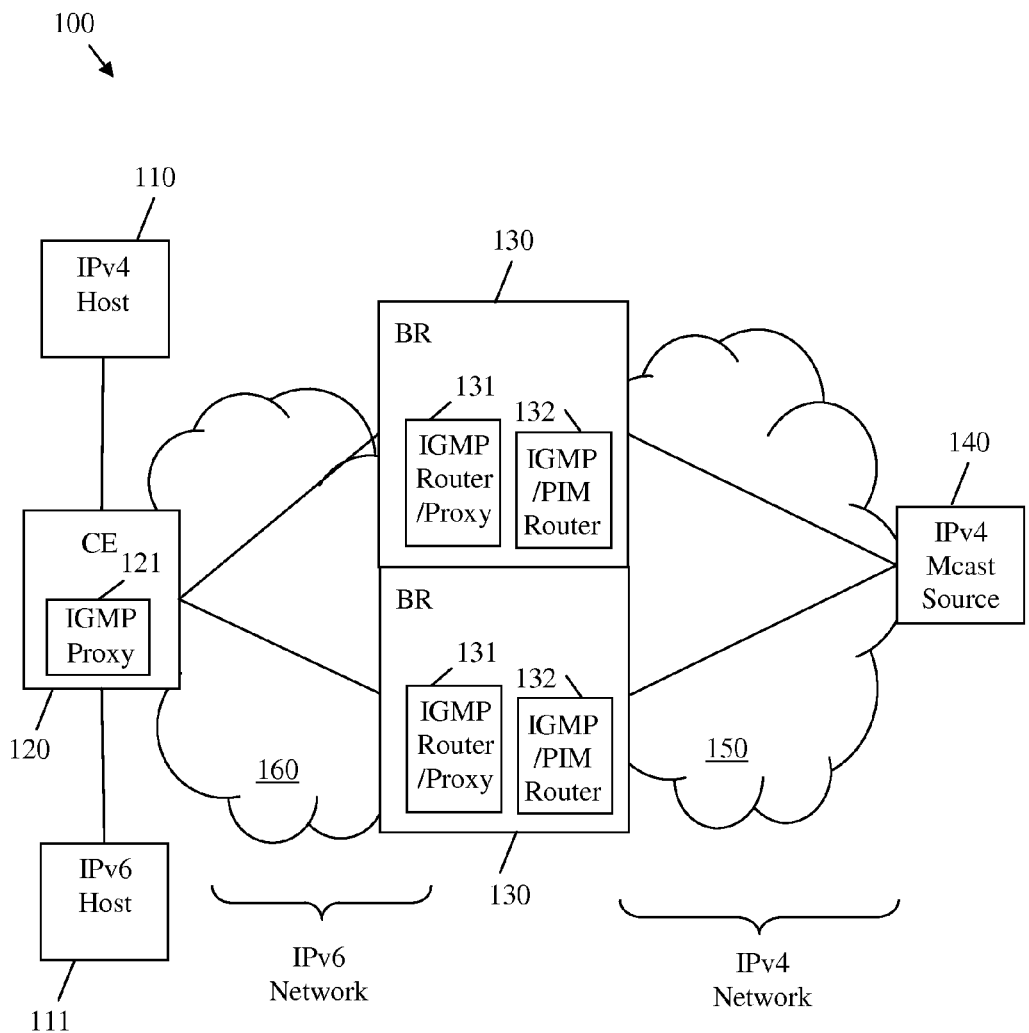
FIG. 1 is a schematic diagram of an embodiment of 4rd network architecture.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Network hosts may wish to access network data using multicast. In multicast, data may be transmitted to multicast groups defined by (S, G) and/or (*, G) where S denotes the IP address of a transmission source, G denotes the IP addresses of a group of receivers, and * denotes the IP addresses for all transmission sources for the group of receivers. A host may access the multicast data by requesting the multicast data from an upstream network node, which may cause the upstream network node to transmit a multicast join message toward the source or a rendezvous point, depending on the multicast implementation. The upstream network node, and all network nodes between the upstream network node and the source/rendezvous point, may join the multicast group, which may result in a multicast tree of nodes in the joined state. Network hosts using the IPv4 address system may wish to access multicast data across an IPv6 network. However, 4rd may be stateless by design (e.g. cannot enter a joined state) and may not support multicast.

Disclosed herein are systems, apparatuses, and methods to support multicast in a 4rd network environment. The system may comprise a 4rd CE device positioned at the edge of an IPv4 network that comprises a host and coupled to an IPv6 network. The system may further comprise a 4rd border router (BR) positioned at the edge of the IPv6 network and a second IPv4 network. The CE may act as an IGMP proxy for the host. In an embodiment, the CE may receive an IGMP membership report from the host and may transmit the IGMP membership report to the BR using anycast. The IGMP membership report may be encapsulated in an IPv6 packet. The BR may decapsulate the packet, join the requested multicast group, and transmit the BR's unicast address to the CE for future IGMP membership reports relating to the multicast group. The BR may then forward multicast data to the CE across the IPv6 network via an IPv4 in IPv6 tunnel. In another embodiment, the CE may receive an IGMP membership report from the host and may translate the IGMP membership report into a MLD membership report, which may be compliant with an IPv6 network. The CE may then transmit the MLD membership report to the BR. The BR may translate the MLD membership report back to an IGMP report and may join the multicast group. In either embodiment, once the BR joins the multicast group, all multicast communications related to the multicast group may pass through the BR as long as the CE is a member of the group. The CE may connect to other BRs for other multicast groups based on network conditions. Some of the embodiments discussed herein may be discussed in the Internet Engineering Task Force (IETF) document draft-sarikaya-softwire-4rdmulticast-03, which is hereby incorporated by reference.

FIG. 1 is a schematic diagram of an embodiment of 4rd network architecture 100. The network 100 may comprise network elements (NEs) such as an IPv4 host 110, an IPv6 host 111, a 4rd CE 120, a plurality of 4rd BRs 130, and an IPv4 multicast source 140. The NEs of network 100 may be coupled and/or connected via an IPv6 network 160 and an IPv4 network 150 as shown in FIG. 1. The BRs 130 and the CE 120 may be configured to support multicast communications between the multicast source 140 and the hosts 110-111 in a 4rd environment (e.g. a combination of IPv6 networks and IPv4 networks such as networks 150 and 160).

As discussed above, a network, such as network 100, may comprise legacy equipment designed to function in an IPv4 environment and updated equipment designed to function in an IPv6 environment. Hosts 110 and 111 each may be any NE, such as a computer, that is connected to a network. Hosts 110-111 may be user devices and/or other devices that provide services, content, etc., to other downstream devices. Host 110 may be a legacy NE that employs an IPv4 network addressing system and host 111 may be an updated device that employs an IPv6 network addressing system. Hosts 110-111 may wish to receive multicast data from a multicast source such as multicast source 140. Multicast data may be any data transmitted with a one to many or a many to many correspondence such as streaming media, internet television, etc. Host 110 and/or host 111 may indicate an interest in receiving multicast data by transmitting a multicast membership report, which may also be referred to as a join message and/or a subscription, toward the multicast source 140. NEs between the hosts 110-111 and the multicast source 140 may enter a joined state and become members of a multicast channel, which may result in the creation of a multicast tree of NEs with the source 140 (or sources) being referred to as the root and the NEs and/or hosts 110-111 being referred to as branches and/or leaves. Multicast data may be transmitted (e.g. multicasted) to the hosts 110-111 via a multicast channel defined by (S, G) and/or (*, G) where S denotes the IP address of a transmission source, such as multicast source 140, G denotes the IP addresses of a group of receivers (e.g. hosts 110-111 and/or intermediate nodes), and * denotes the IP addresses for a plurality of transmission sources for the group of receivers. Multicast channels and/or multicast trees may be generated and/or maintained using various protocols such as IGMP, MLD, or PIM. IGMP (e.g. IGMP version 1, 2, and/or 3) may operate in an IPv4 network, MLD (e.g. MLD version 1 and/or 2) may operate in an IPv6 network, and PIM may operate in either type of network. Multicast trees may be of various types such as Any-Source Multicast (ASM), Dense Mode (DM), Sparse Mode (SM), Source Specific Mode (SSM), Bidirectional Mode (BIDIR), etc.

The CE 120 may be a 4rd device and may configured to connected to host 110 in IPv4 and host 111 in IPv6. For example, CE 120 may comprise a Network Address Translator (NAT) and/or a Network Address and Port Translator (NAPT) for assigning IP addresses to hosts 110-111. CE 120 may comprise and/or be connected to a dual stack device to support both types of connections. The CE may comprise a local area network (LAN) interface and a wide area network (WAN) interface. The LAN interface may connect to the hosts 110-111 and the WAN interface may connect to IPv6 network 160. CE 120 may comprise and/or be configured as an IGMP proxy 121. The IGMP proxy 121 may be configured to receive multicast membership reports from host 110 and/or host 111 (e.g. IGMP membership reports and/or MLD membership reports) on the LAN interface and proxy the reports by transmitting corresponding reports upstream via the WAN interface toward the multicast source 140 using the CE's 120 IP address as the source of the report. The CE 120 may be positioned at the edge of IPv6 network 160, which may be a Mapping of Address and Port—Encapsulation (MAP-E) enabled network. CE 120 may encapsulate the multicast membership reports received in IPv4 format in IPv6 packets prior to transmitting the reports across network 140.

Network 100 may comprise a plurality of BRs 130, which may be positioned at the edge of IPv6 network 160 and IPv4 network 150. A BR 130 may be a 4rd device and may be configured to communicate with CE 120. BR 130 may comprise a WAN interface (e.g. coupled to IPv6 network 160) and a LAN interface (e.g. coupled to IPv4 network 150). BR 130 may further comprise IGMP router 131 coupled to the WAN interface and an IGMP/PIM router 132 coupled to the LAN interface. In addition or in the alternative, BR 130 may comprise an IGMP proxy 131 coupled to the WAN interface and an IGMP/PIM router 132 coupled to the LAN interface. BR 130 may receive the encapsulated membership reports from CE 120 in IPv6 format over IGMP router/proxy 131, which may comprise an IGMP querier, and may establish an IPv4 in IPv6 tunnel with the CE 120. BR 130 may decapsulate the IPv6 packets into IPv4 format for transmission toward the multicast source 140 via IGMP/PIM router 132 over network 150. IGMP/PIM router 132 may be either an IGMP router or a PIM router based on the multicasting protocol operating between BR 130 and multicast source 140 (e.g. IGMP/PIM router 132 may be selected to match the protocol(s) operating over network 150). Router 132 and router/proxy 131 may share the same multicast membership state. BR 130 may transmit the BR's unicast address to CE 120 to allow for the creation of an IPv4 in IPv6 tunnel across IPv6 network 160. Once BR 130 has joined the requested multicast group, BR 130 may receive multicast data from source 140 across the relevant multicast channel and forward the multicast data to hosts 110-111 via the IPv4 in IPv6 tunnel with the CE 120.

CE 120 may access a plurality of multicast groups on behalf of various hosts (e.g. hosts 110-111). When joining a multicast group, CE 120 may transmit a membership report to BR 130 in anycast. In anycast, the BR 130 that is topologically closest to CE 120 (e.g. as determined by network 160 and or related management/control NEs) may receive the membership report. The BR 130 that receives the membership report and joins the multicast group may transmit a unicast address associated with the particular BR 130 to the CE 120. Thereafter, the CE 120 may send all future membership reports and other communications related to the multicast group to the particular BR 130 using the unicast address, which may allow the BR 130 to act as an anchor point for all multicast traffic related to the multicast group. When the CE 120 desires to enter a second multicast group (e.g. at a later time), the CE 120 may send a second membership report indicating the second multicast group to a BR 130 using anycast. Based on changing network conditions, a different BR 130 may be considered topologically closer to the CE 120 (e.g. due to network node/link malfunctions, network traffic congestion, overprovisioned network resources, etc.) when the second membership report is sent. In this fashion, CE 120 may receive multicast data from a plurality of BRs 130, which may allow for network traffic load balancing and/or optimization. The CE 120 may also consistently receive multicast data related to a specific multicast channel from a single BR 130, which may prevent latency, connection interruptions, and other inefficiencies associated with rerouting streaming data.

Figure 2:
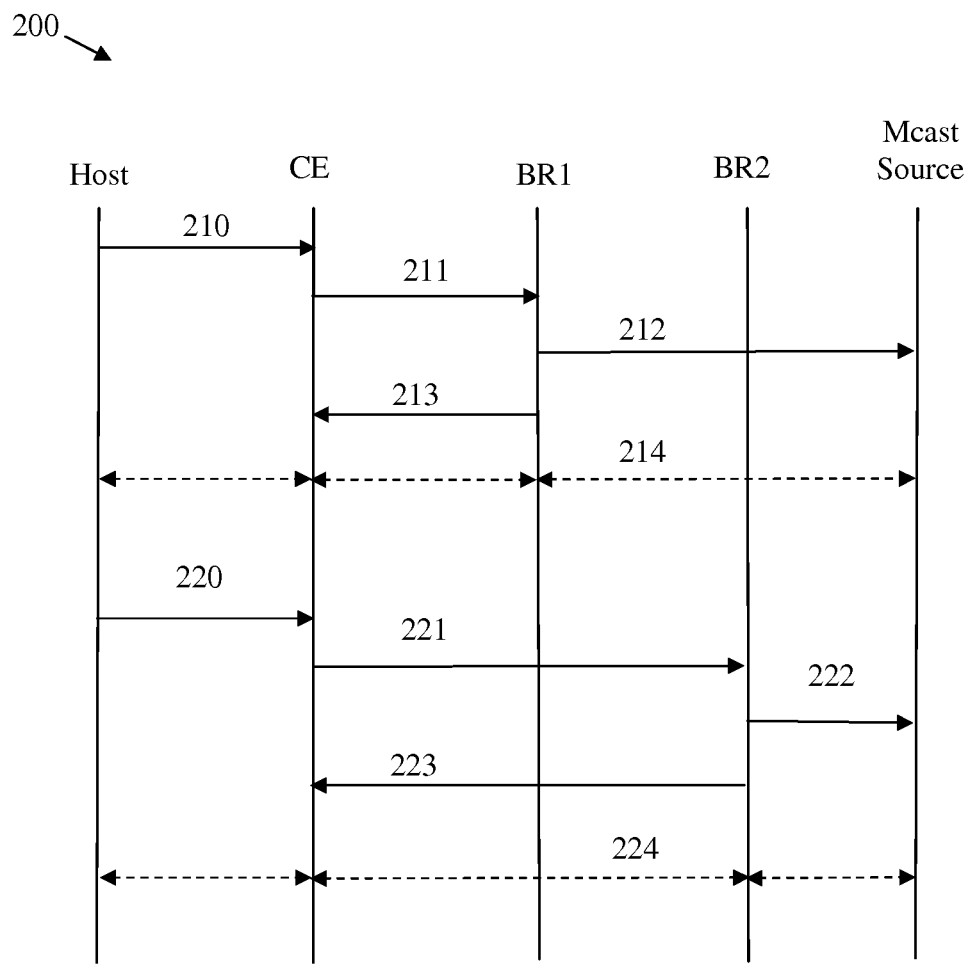
FIG. 2 is a protocol diagram of an embodiment of a method of multicasting in a 4rd network.

FIG. 2 is a protocol diagram of an embodiment of a method 200 of multicasting in a 4rd network, such as network 100. The host, CE, BR1, BR2, and multicast source indicated in FIG. 2 may be implemented as IPv4 host 110, CE 120, BRs 130, and IPv4 multicast source 140 of FIG. 1, respectively. A host may desire to join a first multicast group. The host may transmit a first membership report 210 (e.g. an IGMP membership report) associated with the first multicast group to a CE. The CE may proxy the first membership report 210, encapsulate the proxied membership report 211 in an IPv6 message, and transmit the proxied membership report 211 across an IPv6 network. The proxied membership report 211 may indicate CE as the source of the message 211 and may be sent using anycast. The network may determine that BR1 is topologically the closest BR to CE and may forward proxied membership report 211 to BR1. BR1 may decapsulate the membership report 211 and transmit membership report 212 toward the multicast source, which may cause BR1 to join the first multicast group. BR1 may transmit a message 213 to CE that comprises the unicast address associated with BR1. BR1 may also obtain the unicast address of CE from membership report 211. The unicast addresses of BR1 and CE may be used to setup an IPv4 in IPv6 tunnel between the two for subsequent membership reports and/or multicast data transmissions. Message 213 may be transmitted prior to or subsequent to message 212. The multicast source may transmit multicast data 214 related to the first multicast group to the host via BR1 and CE (e.g. via the IPv4 in IPv6 tunnel). The multicast data 214 may be encapsulated at BR1 into IPv6 packets and decapsulated at the CE.

At a later time, the host may desire to join a second multicast group. The host may send a second membership report 220 to CE. CE may proxy and encapsulate the membership report 220 and transmit the proxied membership report 221 using anycast in substantially the same manner as 211. Due to changes in network topology and/or network status, the network may determine that BR2 is topologically the closest BR to CE and may forward the proxied membership report 221 to BR2. BR2 may join the second multicast group by transmitting a membership report 222 to the source in substantially the same manner as membership report 212. BR2 may also transmit BR2's unicast address in a message 223 to CE and setup a network tunnel in substantially the same manner as in message 213. The source may then transmit multicast data 224 related to the second multicast group to the host via BR2 and CE, for example by encapsulating and decapsulating the multicast data 224, respectively. In this manner, the host may receive (e.g. substantially simultaneously) multicast data 214 via BR1 and multicast data 224 via BR2.

Figure 3:
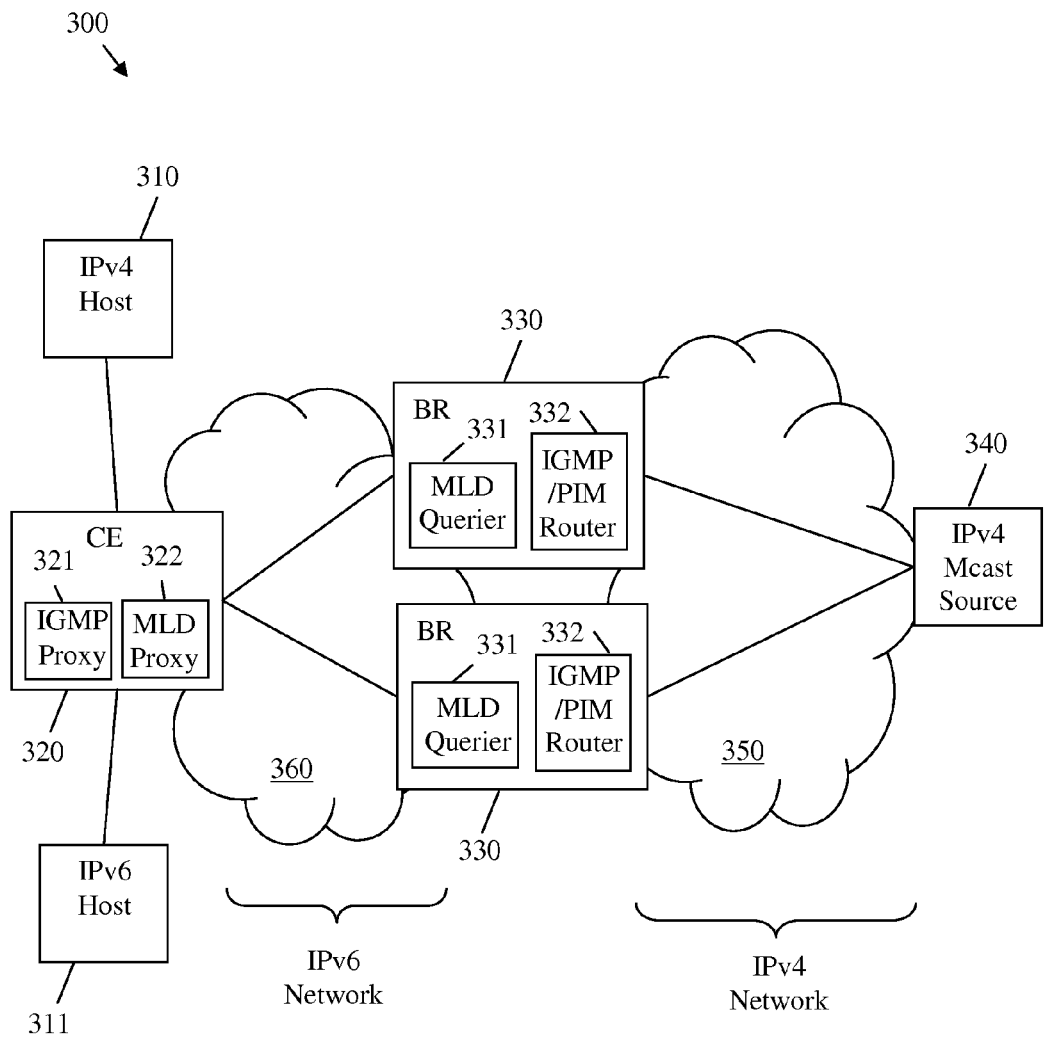
FIG. 3 is a schematic diagram of another embodiment of 4rd network architecture.

FIG. 3 is a schematic diagram of another embodiment of 4rd network architecture 300. Network 300 may comprise an IPv4 host 310, an IPv6 host 311, a CE 320, a BR 330, and a multicast source 340 connected via an IPv6 network 360 and an IPv4 network 350, each of which may be substantially similar to hosts 110-111, CE 120, BR 130, multicast source 140, IPv6 network 160, and IPv4 network 150. However, network 360, BR 330, and CE 320 may be configured for Mapping of Address and Port-Translation (MAP-T).

CE 320 may comprise an IGMP proxy 321 and an MLD proxy 322 which may be coupled to the CEs 320 LAN interface and WAN interface, respectively. The IGMP proxy 321 may receive multicast membership reports (e.g. IGMP membership reports) from hosts 310-311 and may proxy the membership reports. The CE 320 may translate the proxied membership reports from IGMP into MLD and forward them to the MLD proxy 322. The MLD proxy may proxy the MLD membership reports, and may transmit the proxied MLD membership reports to BR 330 using the unicast address of the CE's 320 MLD proxy as the source address of the proxied MLD membership report.

The BR 330 may comprise an IGMP/PIM router 332, which may be substantially similar to IGMP/PIM router 132. BR 330 may also comprise an MLD querier 331. The MLD querier 331 may receive the proxied MLD membership report from the CE 320. If the BR 330 comprises a PIM router 332, the BR 330 may forward the MLD membership report to the PIM router 332, which may join the requested multicast group (e.g. by transmitting a PIM join message). If the BR 330 comprises an IGMP router 332, the BR 330 may translate the proxied MLD membership into IGMP and forwarded to the IGMP router 332, which may join the requested multicast group (e.g. by transmitting a IGMP join message). If the multicast group operates using ASM, BR 330 may be selected as the rendezvous point for the associated multicast tree.

Figure 4:
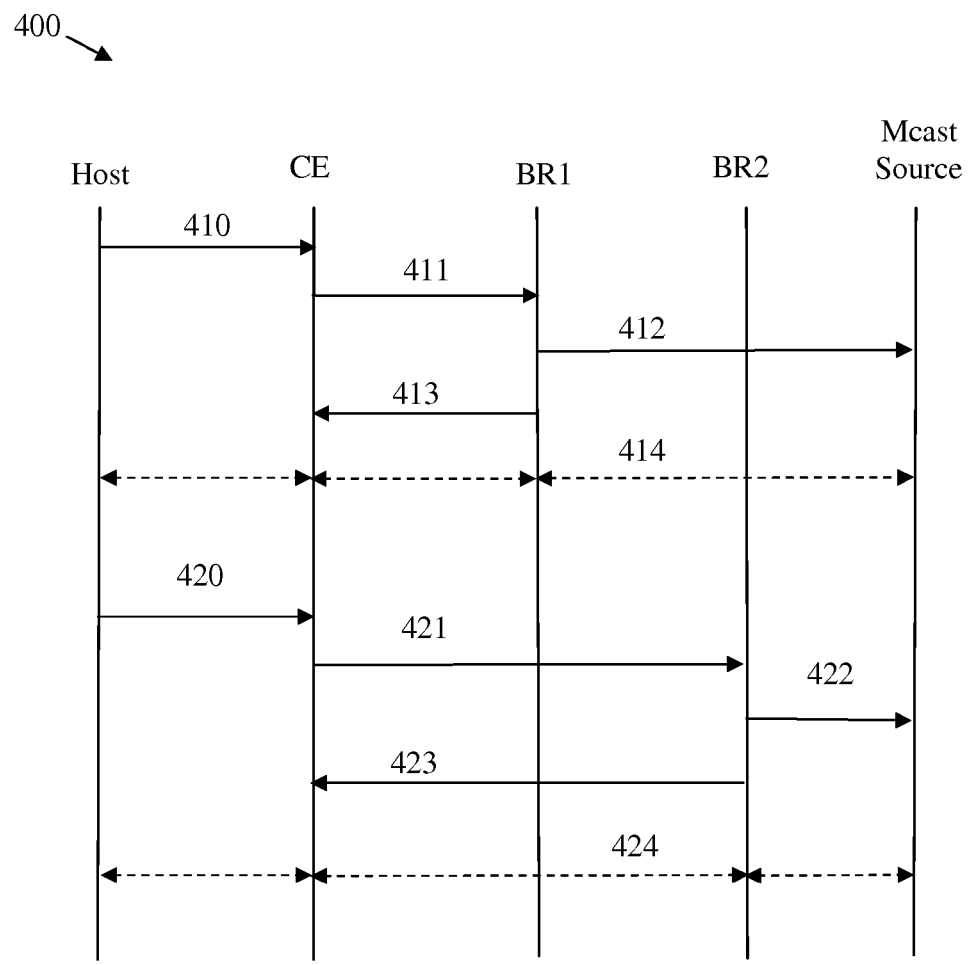
FIG. 4 is a protocol diagram of another embodiment of a method of multicasting in a 4rd network.

FIG. 4 is a protocol diagram of another embodiment of a method 400 of multicasting in a 4rd network. Method 400 may be similar in some aspects to method 200, but may be configured to operate on network 300. The host may transmit a multicast membership report 410 (e.g. IGMP membership report) to the CE. The CE may receive the membership report 410 on the CE's IGMP proxy and may proxy the report. The CE may translate the proxied report into MLD and may proxy the MLD report on the CE's upstream interface (e.g. WAN interface). The CE may then transmit the proxied MLD membership report 411 to BR1 using anycast. BR1 may receive the proxied MLD membership report 411 on a downstream interface (e.g. WAN interface) at BR1's MLD querier. BR1 may then translate the MLD membership report 411 into an IGMP membership report 412 and transmit the IGMP membership report 412 towards the multicast source, thereby joining the multicast group. Alternatively, the CE may be equipped with a PIM router in which case the MLD membership report 411 may transmitted upstream as a PIM join message 412, which may not require translation. In either embodiment, BR1 may transmit BR1's unicast address 413 to the CE for future transmissions related to the multicast group. Multicast data 414 may then be transmitted from the multicast source to the host via BR1 and CE. The multicast data 414 may be transmitted in IPv4 format from the source, translated into IPv6 by BR1, translated back to IPv4 by the CE, and forwarded to the host. If the host is an IPv6 host, translation by the CE may be unnecessary.

Messages 420-424 may be substantially similar to 410-414, but may be routed through BR2. The host may join a second multicast group by transmitting membership report 420, which may be substantially similar to 410. CE may translate and/or proxy the membership report, as discussed above, and forward the proxied MLD membership report 421 using anycast. BR2 may receive the proxied MLD membership report 421 as the topologically closest BR. BR2 may then transmit a membership report 422 toward the multicast source, which may be substantially similar to membership report 412. BR2 may then transmit BR2's unicast address 423 to CE. Multicast data 424 may then be routed from the multicast source to the host via BR2 and CE, in a substantially similar manner to multicast data 414.

Figure 5:
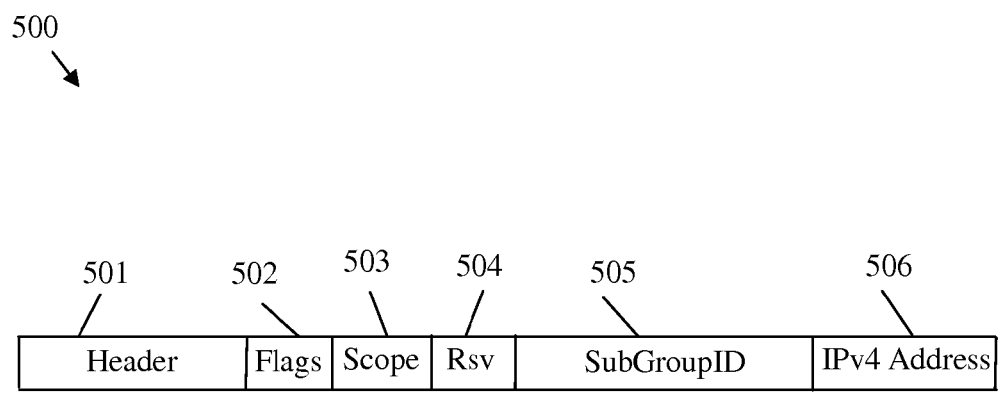
FIG. 5 is a schematic diagram of an embodiment of an encoding of an IPv6 multicast address translated from an IPv4 multicast address.

FIG. 5 is a schematic diagram of an embodiment of an encoding 500 of an IPv6 multicast address translated from an IPv4 multicast address. Encoding 500 may be the result of a translation by a CE (e.g. CE 320) prior to transmitting a related multicast membership report over an IPv6 network (e.g. IPv6 network 360). Encoding 500 may comprise an ASM_MPREFIX for an ASM multicast group or SSM_MPREFIX for a SSM multicast group, respectively, as defined in IETF document I-D.ietf-mboned-64-multicast-address-format, which is hereby incorporated by reference. The encoding may be 128 bits long and may be numbered from bit position zero to bit position 127. The encoding 500 may comprise a header 501, which may be eight bits long, may extend from position zero to position seven and may indicate that the encoding 500 is a multicast address. All bits in the header 501 may be set to one. The encoding 500 may comprise a flags field 502, which may be four bits long, may extend from position eight to position eleven, and may comprise flags, which may indicate information related to the multicast address. The encoding 500 may comprise a scope field 503, which may be four bits long, may extend from position twelve to position fifteen, and may indicate the scope of the multicast address (e.g. global scope, scope limited to particular topological region, etc.) The encoding 500 may comprise a reserved field 504, which may be four bits length, may extend from position sixteen to position nineteen, and may indicate that encoding 500 comprises an embedded IPv4 address. The fourth bit of the reserved field 504 may be referred to as the M bit, and may be set to about one to indicate that an IPv4 address is embedded in the last thirty two bits of encoding 500. The encoding 500 may comprise a SubGroupID field 505, which may be seventy six bits long, may extend from position twenty to position ninety five, and may indicate information related to the multicast group. The encoding 500 may comprise an IPv4 address field 506, which may be thirty two bits long, may extend from position ninety six to position 127, and may indicate the IPv4 multicast address associated with the encoding 500.

Encoding 500 may be employed by a BR 130, BR 330, CE 120, and/or CE 320 when translating an IPv4 multicast address to an IPv6 multicast address. For example, in ASM, BR 130/330 may be assigned a unique ASM-MPREFIX64 prefix. CE 120/320 may learn BR's 130/330 prefix and create an IPv6 multicast address using the BR's 130/330 prefix as the first ninety six bits in encoding 500 and the IPv4 multicast address as the last thirty two bits in encoding 500, respectively. As another example, SSM may require that each multicast source 140/340 be designated with a unique address. The BR 130/330 may be configured to assign a unique IPv6 address to each upstream multicast source 140/340, which may be prepended to an IPv4 source address in encoding 500. In either case, BR 130/330 may receive a packet comprising encoding 500, recognize the ASM_MPREFIX64 and/or SSM_MPREFIX64, determine the multicast address contained in the last thirty two bits of encoding 300, and join the appropriate multicast group on the BR's 130/330 upstream interface.

Figure 6:
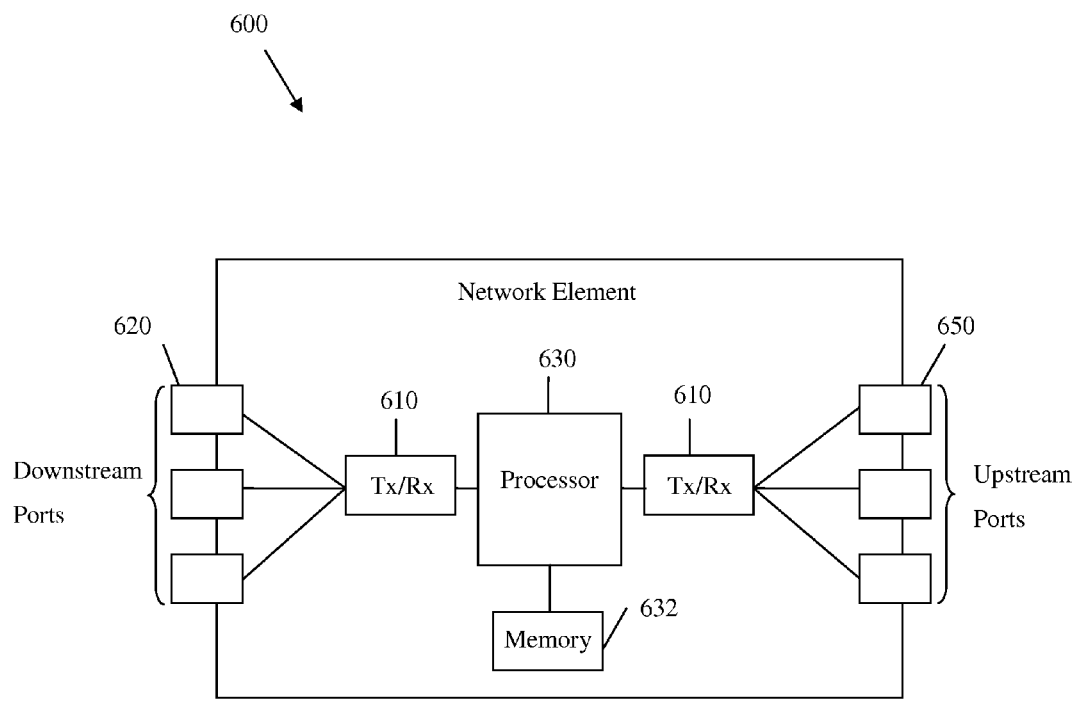
FIG. 6 is a schematic diagram of an embodiment of a general purpose network component.

FIG. 6 is a schematic diagram of an embodiment of a Network Element (NE) 600, which may function as a node in network 100 and/or 300, for example a host 110/310, a CE 120/320, a BR 130/330, and/or a multicast source 140/340. One skilled in the art will recognize that the term NE encompasses a broad range of devices of which NE 600 is merely an example. NE 600 is included for purposes of clarity of discussion, but is in no way meant to limit the application of the present disclosure to a particular NE embodiment or class of NE embodiments. At least some of the features/methods described in the disclosure may be implemented in a network apparatus or component, such as an NE 600. For instance, the features/methods in the disclosure may be implemented using hardware, firmware, and/or software installed to run on hardware. The NE 600 may be any device that transports frames through a network, e.g., a switch, router, bridge, server, etc. As shown in FIG. 6, the NE 600 may comprise transceivers (Tx/Rx) 610, which may be transmitters, a receiver, or combinations thereof. A Tx/Rx 610 may be coupled to plurality of downstream ports 620 for transmitting and/or receiving frames from other nodes, a Tx/Rx 610 coupled to plurality of upstream ports 650 for transmitting and/or receiving frames from other nodes, and a processor 630 coupled to the Tx/Rxs 610 to process the frames and/or determine which nodes to send frames to. The processor 630 may comprise one or more multi-core processors and/or memory devices 632, which may function as data stores. The downstream ports 620 and/or upstream ports 650 may contain electrical and/or optical transmitting and/or receiving components. NE 600 may or may not be a routing component that makes routing decisions.

Figure 7:
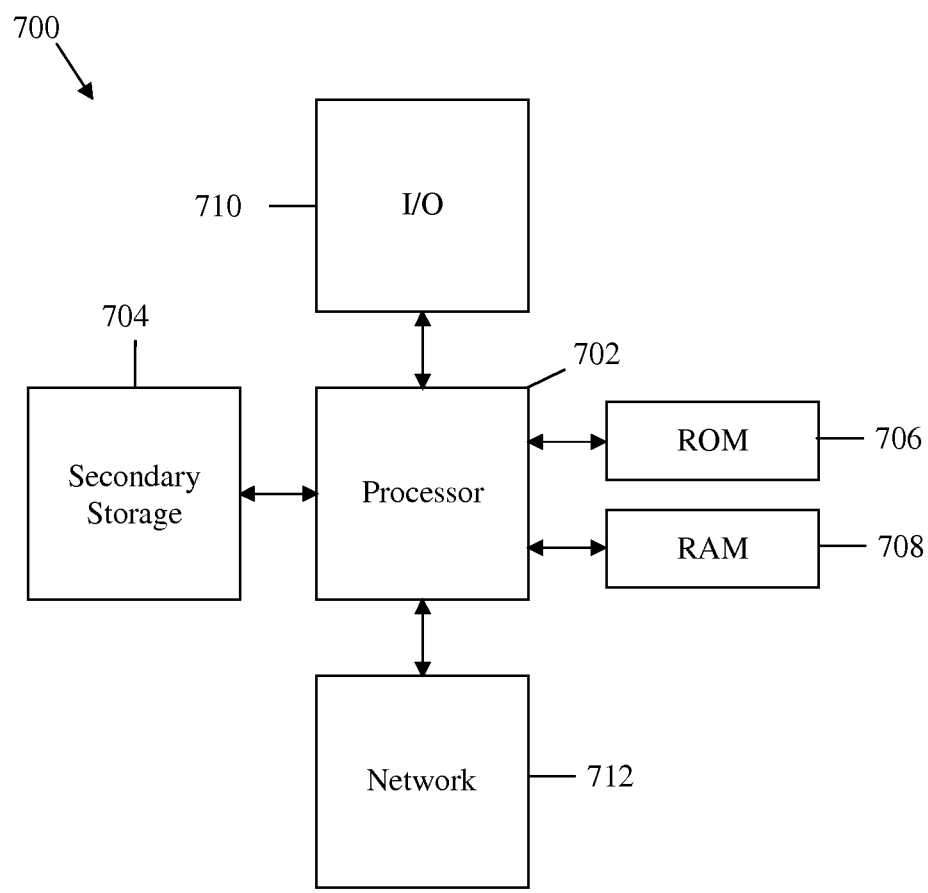
FIG. 7 is a schematic diagram of an embodiment of a general-purpose computer system.

The network components, devices, systems, and methods described above may be implemented on any general-purpose network component, such as a computer or network component with sufficient processing power, memory resources, and network throughput capability to handle the necessary workload placed upon it. FIG. 7 illustrates a typical, general-purpose network component 700 suitable for implementing one or more embodiments of the components disclosed herein, including steps of methods 200 and 400. The network component 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips, or may be part of one or more application specific integrated circuits (ASICs) and/or digital signal processors (DSPs).

The secondary storage 704 is typically comprised of one or more disk drives or tape drives and is used for non-volatile storage of data and as an over-flow data storage device if RAM 708 is not large enough to hold all working data. Secondary storage 704 may be used to store programs that are loaded into RAM 708 when such programs are selected for execution. The ROM 706 is used to store instructions and perhaps data that are read during program execution. ROM 706 is a non-volatile memory device that typically has a small memory capacity relative to the larger memory capacity of secondary storage 704. The RAM 708 is used to store volatile data and perhaps to store instructions. Access to both ROM 706 and RAM 708 is typically faster than to secondary storage 704.

The network connectivity devices 712 may serve as an output and/or input device of network component 700. The network connectivity devices 712 may take the form of modems, modem banks, Ethernet cards, universal serial bus (USB) interface cards, serial interfaces, token ring cards, fiber distributed data interface (FDDI) cards, and other well-known network devices. These network connectivity devices 712 may enable the processor 702 to communicate with an Internet and/or one or more intranets and/or one or more client devices.

It is understood that by programming and/or loading executable instructions onto the NE 600, at least one of the processor 630, memory 632, and/or Tx/Rx 610 are changed, transforming the NE 600 in part into a particular machine or apparatus, e.g., a multi-core forwarding architecture, having the novel functionality taught by the present disclosure. Similarly, it is understood that by programming and/or loading executable instructions onto the network component 700, at least one of the processor 702, the ROM 706, and the RAM 708 are changed, transforming the network component 700 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 5, 4, etc.; greater than 0.10 includes 0.11, 0.12, 0.15, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 5 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An Internet Protocol (IP) version four (IPv4) Residual Deployment via IP version six (IPv6) (4rd) customer edge (CE) router comprising:
a transceiver configured to communicate with an IPv6 network; and
a processor coupled to the transceiver and configured to:
receive multicast packets from a multicast source via the IPv6 network;
transmit the multicast packets to a host;
transmit a multicast membership report message to a 4rd border relay (BR) via the IPv6 network, wherein the multicast membership report message is transmitted to the BR on behalf of the host, and wherein the multicast membership report message is transmitted via anycast;

receive a unicast address of the BR in response to the multicast membership report message, wherein the multicast membership report message is associated with a multicast group; and transmit a plurality of subsequent multicast membership report messages associated with the multicast group on behalf of the host, wherein all the subsequent multicast membership report messages are transmitted to the BR using the BR's unicast address.

2. The 4rd CE of claim 1, further comprising an internet group management protocol (IGMP) proxy, wherein the IGMP proxy configured to proxy internet group management protocol (IGMP) membership report messages for the host.

3. The 4rd CE of claim 1, wherein the processor is further configured to:

receive an IGMP membership report message from the host prior to transmitting the multicast membership report message to the BR; and create the multicast membership report message by encapsulating the IGMP membership report message in an IPv6 packet.

4. The 4rd CE of claim 1, wherein the processor is further configured to:

receive an IGMP membership report message from host prior to transmitting the first multicast membership report message to the BR; and create the multicast membership report message by translating the IGMP membership report message into a multicast listener discovery (MLD) membership report message.

5. An Internet Protocol (IP) version four (IPv4) Residual Deployment via IP version six (IPv6) (4rd) border relay (BR) comprising:

a transceiver configured to communicate with an IPv6 network; and a processor coupled to the transceiver and configured to:
receive multicast packets from a multicast source;
communicate with the multicast source via an IPv4 network; and
transmit the multicast packets to a host via the IPv6 network and a 4rd customer edge (CE), wherein the processor is further configured to implement a first internet group management protocol (IGMP) router coupled to the IPv6 network, wherein the first IGMP router is configured to receive an IPv6 packet from the CE via the IPv6 network, and wherein the IPv6 packet comprises an encapsulated IPv4 IGMP membership report message.

6. The 4rd BR of claim 5, wherein the processor is further configured to:

receive a multicast membership report from the CE via the IPv6 network; and transmit a unicast IP address of the BR to the CE.

7. The 4rd BR of claim 5, further comprising a second IGMP router coupled to the IPv4 network, and wherein the processor is further configured to:

decapsulate the IPv6 packet; and transmit the IGMP membership report message toward the multicast source via the second IGMP router.

8. The 4rd BR of claim 5, further comprising a protocol independent multicast (PIM) router coupled to the IPv4 network, wherein the PIM router is configured to transmit a PIM join message toward the multicast source via the IPv4 network, wherein the IGMP membership report message is associated with a multicast group, and wherein the PIM join message is associated with the multicast group.

9. The 4rd BR of claim 5, wherein the first IGMP router comprises a first IGMP proxy coupled to the IPv6, wherein the first IGMP proxy is configured to receive the IPv6 packet from the CE via the IPv6 network.

10. A method comprising:

sending, by a host, an internet group management protocol (IGMP) report message to a Residual Deployment via Internet Protocol (IP) version six (IPv6) (4rd) customer edge (CE) router to join an IP version four (IPv4) multicast group;

encapsulating, by the CE, the IGMP report message in an IPv6 message and sending the IPv6 message in anycast to find a topologically closest 4rd Border Relay (BR);

receiving, by the closest BR, the IPv6 message and decapsulating the IPv6 message; and sending, by the closest BR, an upstream IGMP join message or a protocol independent multicast (PIM) join message to subscribe to a multicast group.

11. The method of claim 10, further comprising:

receiving, by the CE, a unicast address of the closest BR; and sending, by the CE, all subsequent IGMP join messages for the multicast group to the closest BR's unicast address.

12. The method of claim 10, further comprising:

receiving, by the CE, another join message for a different multicast group; and encapsulating and sending the join message to a BR in anycast to enable the use of multiple BRs that may-be-are deployed as anchor points for the multicast groups.

13. A method comprising:

receiving internet group management protocol (IGMP) reports at a customer edge (CE) router from a plurality of hosts requesting to join one or more Internet Protocol (IP) version four (IPv4) multicast groups, wherein the CE comprises an internet group management protocol (IGMP) proxy facing an IPv4 local area network (LAN) interface and a multicast listener discovery (MLD) proxy facing an IPv6 wide area network (WAN) interface;

synthesizing, by the CE, at least one IPv6 multicast group address corresponding to the IPv4 multicast groups; and sending, by the MLD proxy, an aggregated MLD report message, based on the IGMP reports, upstream to join the multicast group.

14. The method of claim 13 further comprising:

receiving, by the closest BR, the MLD report message on an IPv6 wide area network (WAN) interface of the BR; and transmitting, by the BR, a multicast join message on an upstream interface connected to an IPv4 network in IGMP or protocol independent multicast (PIM).

* * * * *

UNITED STATES PATENT AND TRADEMARK OFFICE
CERTIFICATE OF CORRECTION

PATENT NO. : 9,036,633 B2  
APPLICATION NO. : 13/652183  
DATED : May 19, 2015  
INVENTOR(S) : Behcet Sarikaya Page 1 of 1

It is certified that error appears in the above-identified patent and that said Letters Patent is hereby corrected as shown below:

Title Page 2, Col. 2, line 10, under References Cited, Other Publications:

Delete "Fenner, B., et al., "Internet Group Management Protocol (IGMP)/Multicast Listener Discovery (MLD)-Based Multicast Forwarding ("Igmp/MLD Proxying")," Network Working Group, RFC 4605, August 2006, 13 pages." and insert -- Fenner, B., et al., "Internet Group Management Protocol (IGMP)/Multicast Listener Discovery (MLD)-Based Multicast Forwarding ("IGMP/MLD Proxying")," Network Working Group, RFC 4605, August 2006, 13 pages. --

In the Claims:

Column 12, Lines 32-38, Claim 12, should read as:

12. The method of claim 10, further comprising:
receiving, by the CE, another join message for a different multicast group; and
encapsulating and sending the join message to a BR in anycast to enable the use of multiple BRs
   that are deployed as anchor points for the multicast groups.

Signed and Sealed this  
Ninth Day of February, 2016

Michelle K. Lee  
*Director of the United States Patent and Trademark Office*